(12) United States Patent
Gordon et al.

(10) Patent No.: US 12,043,311 B2
(45) Date of Patent: *Jul. 23, 2024

(54) CAMBER ADJUSTING ASSEMBLY

(71) Applicants: Robby Gordon, Charlotte, NC (US);
Mike Niemiec, Charlotte, NC (US)

(72) Inventors: Robby Gordon, Charlotte, NC (US);
Mike Niemiec, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/898,264

(22) Filed: Aug. 29, 2022

(65) Prior Publication Data

US 2022/0402548 A1    Dec. 22, 2022

Related U.S. Application Data

(63) Continuation of application No. 17/100,645, filed on Nov. 20, 2020, now Pat. No. 11,427,256, which is a continuation of application No. 16/256,419, filed on Jan. 24, 2019, now Pat. No. 10,850,771, which is a continuation of application No. 15/242,380, filed on Aug. 19, 2016, now Pat. No. 10,266,205.

(60) Provisional application No. 62/208,537, filed on Aug. 21, 2015.

(51) Int. Cl.
*B62D 17/00* (2006.01)
*B60G 3/14* (2006.01)
*B60G 7/02* (2006.01)

(52) U.S. Cl.
CPC ............... *B62D 17/00* (2013.01); *B60G 3/14* (2013.01); *B60G 7/02* (2013.01); *B60G 2200/1322* (2013.01); *B60G 2200/46* (2013.01); *B60G 2204/143* (2013.01); *B60G 2206/124* (2013.01); *B60G 2206/50* (2013.01)

(58) Field of Classification Search
CPC .......... B60G 7/001; B60G 3/08; B60G 3/145; B60G 2200/4622; B60G 2206/124; B62D 7/00
USPC ...................................... 280/124.134, 86.756
See application file for complete search history.

(56) References Cited

U.S. PATENT DOCUMENTS 10,850,771 B2 * 12/2020 Gordon .................... B60G 3/14

* cited by examiner

*Primary Examiner* — Faye M Fleming
(74) *Attorney, Agent, or Firm* — Barry Choobin; Patent 360

(57) ABSTRACT

An apparatus and a method are provided for a camber adjustment assembly, comprising: first and second end plates coupled to a substantially planar center portion, wherein the first and second end plates comprise a generally triangular configuration; a chassis element coupled to a trailing arm and the camber adjustment assembly, and wherein a force may be applied to the camber adjustment assembly so as to desirably induce a positive or negative camber condition.

19 Claims, 4 Drawing Sheets

CAMBER ADJUSTING ASSEMBLY

CROSS REFERENCE TO RELATED APPLICATION

This application is a continuation of, and claims benefit of, U.S. patent application Ser. No. 17/100,645 filed on Nov. 20, 2020 and U.S. patent application Ser. No. 16/256,419 filed on Jan. 24, 2019 and U.S. patent application Ser. No. 15/242,380, filed Aug. 19, 2016, which claims the benefit of priority to U.S. Provisional Application No. 62/208,537, filed Aug. 21, 2015, both of which are hereby incorporated herein by reference in their entirety.

FIELD

The field of the present disclosure generally relates to vehicle suspensions. More particularly, the field of the invention relates to an apparatus and a method for a camber adjusting assembly that is configured to accommodate increased levels of suspension travel and provides for the adjustment of camber angle, especially in off-road vehicle applications.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, the most common use of off-road vehicles is for sight-seeing in areas that may not be accessed via standard, paved roads.

The use of higher clearance, higher traction vehicles enables off-road vehicles to access trails and roads that have rough and low traction surfaces that may not be traversed using a standard, on-road vehicle. Furthermore, off-road vehicles typically comprise larger wheels, wider tires, and suspension configurations that are specifically engineered for use in off-road applications. As a result, a plurality of parameters must be adjusted to achieve desired levels of suspension travel, comfort, and also so that wider and larger wheel/tire configurations can be made to fit a particular chassis/application.

One parameter that may be adjusted is referred to as "camber angle." Camber angle refers to the angle between a vertical axis of the wheels, and the vertical axis of the vehicle when viewed from the front or rear. If the top of the wheel extends further out than the bottom (that is, away from the vehicle's axle), it is generally referred to as a "positive camber" condition. Similarly, if the bottom of the wheel is extends further out than the top of the wheel, it is referred to as a "negative camber" condition.

Conventionally, camber kits were made available so that the camber angle could be adjusted. However, for off-road vehicles especially, adding parts to the underbody of the vehicle is not desirable due to the potential clearance issues with respect to off-road elements, such as rocks, dunes, and the like. If the camber kits fail, the results could be catastrophic.

Accordingly, there exists a need for adjusting the camber angle without the addition of a camber kit, such that suspension clearance is desirably maintained.

BRIEF DESCRIPTION OF THE DRAWINGS

The drawings refer to embodiments of the present disclosure in which.

Figure 1:
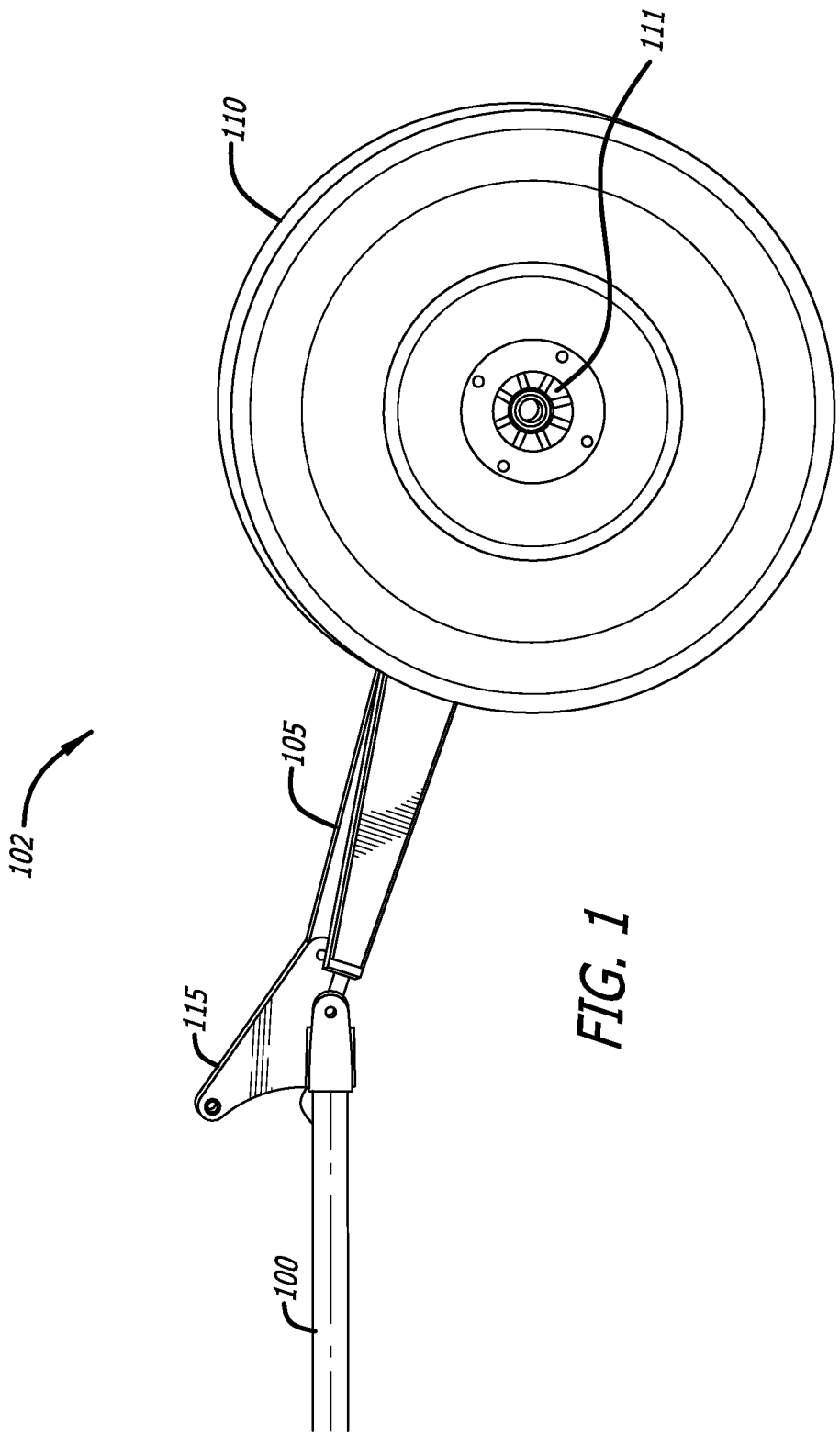
FIG. 1 illustrates a side plan view of an exemplary camber adjusting assembly and wheel/tire configuration according to one embodiment of the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first plate," may be made. However, the specific numeric reference should not be interpreted as a literal sequential order but rather interpreted that the "first plate" is different than a "second plate." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In one embodiment, a camber adjustment assembly is disclosed, comprising: first and second end plates coupled to a substantially planar center portion, wherein the first and second end plates comprise a generally triangular configuration; a chassis element coupled to a trailing arm and the camber adjustment assembly, and wherein a force may be applied to the camber adjustment assembly so as to desirably induce a positive or negative camber condition.

In one embodiment, the chassis element is coupled to the camber adjustment assembly using a single eye joint. In another embodiment, the first and second end plates further comprise a plurality of holes at each corner, wherein each hole is configured to receive a fastener. In yet another embodiment, the camber may be adjusted substantially 4.5". In one embodiment, the camber may be adjusted to achieve a negative camber condition so as to preload an off-road vehicle's wheel/tire configuration in a substantially vertical orientation with respect to terrain.

In one embodiment, a wheel camber adjustment assembly configured to change a camber angle of the wheel is disclosed, comprising: a first end plate and a second end plate having generally identical triangular shapes and a hole disposed at each corner of the triangular shape; a planar center portion disposed between the first and second end plates, such that similar holes at the corners of the first and second end plates are aligned; a first corner of the triangular shape configured to be hingedly coupled a trailing arm comprising a wheel hub disposed within a cylindrical axle support of the trailing arm; and a second corner and a third corner of the triangular shape configured to be hingedly coupled to a chassis element of a vehicle, such that rotating the wheel camber adjustment assembly around either of the second or third corners causes a corresponding change in the camber angle of the wheel.

In one embodiment, the wheel camber adjustment assembly and the trailing arm are configured to be installed onto either side of a vehicle. In one embodiment, the wheel camber adjusting assembly is configured so as to allow for positive and negative camber conditions, as required by any of various applications. In another embodiment, the wheel camber adjusting assembly is configured to adjust camber angle settings in any of various off-road vehicles.

In one embodiment, the upper ball joint and a lower ball joint are incorporated into the wheel camber adjusting assembly, the upper ball joint being positioned further from a center of the vehicle than the lower ball joint, such that suspension of the vehicle is effective in a positive camber condition.

In another embodiment, the wheel camber adjustment assembly is configured to be adjusted so as to neutralize positive or negative camber angle offsets. In one embodiment, the wheel camber adjustment assembly is configured to provide at least substantially 4.5" of adjustment capacity when incorporated with both wheels of a rear axle of the vehicle.

In one embodiment, application of a downwardly-directed force to the wheel camber adjustment assembly introduces a negative camber angle into the suspension. In one embodiment, application of an upwardly-directed force to the wheel camber adjustment assembly introduces a positive camber angle into the suspension. In another embodiment, the camber adjustment assembly is coupled to the trailing arm by way of one or more bearings. In yet another embodiment, the camber adjustment assembly is coupled to the chassis element by way of one or more suitable joints, such as single eye, double eye, fork, or knuckle pin joints.

In one embodiment, the wheel camber adjustment assembly further comprises one or more tension inducing mechanisms configured to bias the wheel camber adjustment assembly to a desired camber angle. In another embodiment, the wheel camber adjustment assembly is configured to continuously change the camber angle in response to road conditions so as to improve contact between the wheels and the road.

In general, the present disclosure describes an apparatus and a method for a plunging constant-velocity (CV) joint that is configured to accommodate increased levels of suspension travel and provides for an adjustment of camber angle, especially in off-road vehicle applications. As discussed herein, a suspension assembly comprises a chassis element, a trailing arm, a hub, and a camber adjusting assembly.

FIG. 1 illustrates a side plan view of an exemplary trailing arm and wheel/tire configuration according to one embodiment of the present disclosure. As shown, a chassis element 100 is communicatively coupled with a trailing arm 105 so as to couple the chassis element 100 with the wheel and tire configuration 110. The chassis element 100 is also coupled to the camber adjusting assembly 115 at one end. A hub 111 is disposed at a terminal end of the trailing arm 105, so as to communicate a rotational force from a driveshaft and axle, for example. It is envisioned that the assembly 102 may be used universally, and thus may be installed on either side of an off-road vehicle. As discussed herein, a camber adjusting assembly 115 may communicatively couple the trailing arm 105 with the chassis element 100. Specifically, the camber adjusting assembly 115 is configured so as to allow for positive and negative camber conditions as required by any of various applications.

Figure 2:
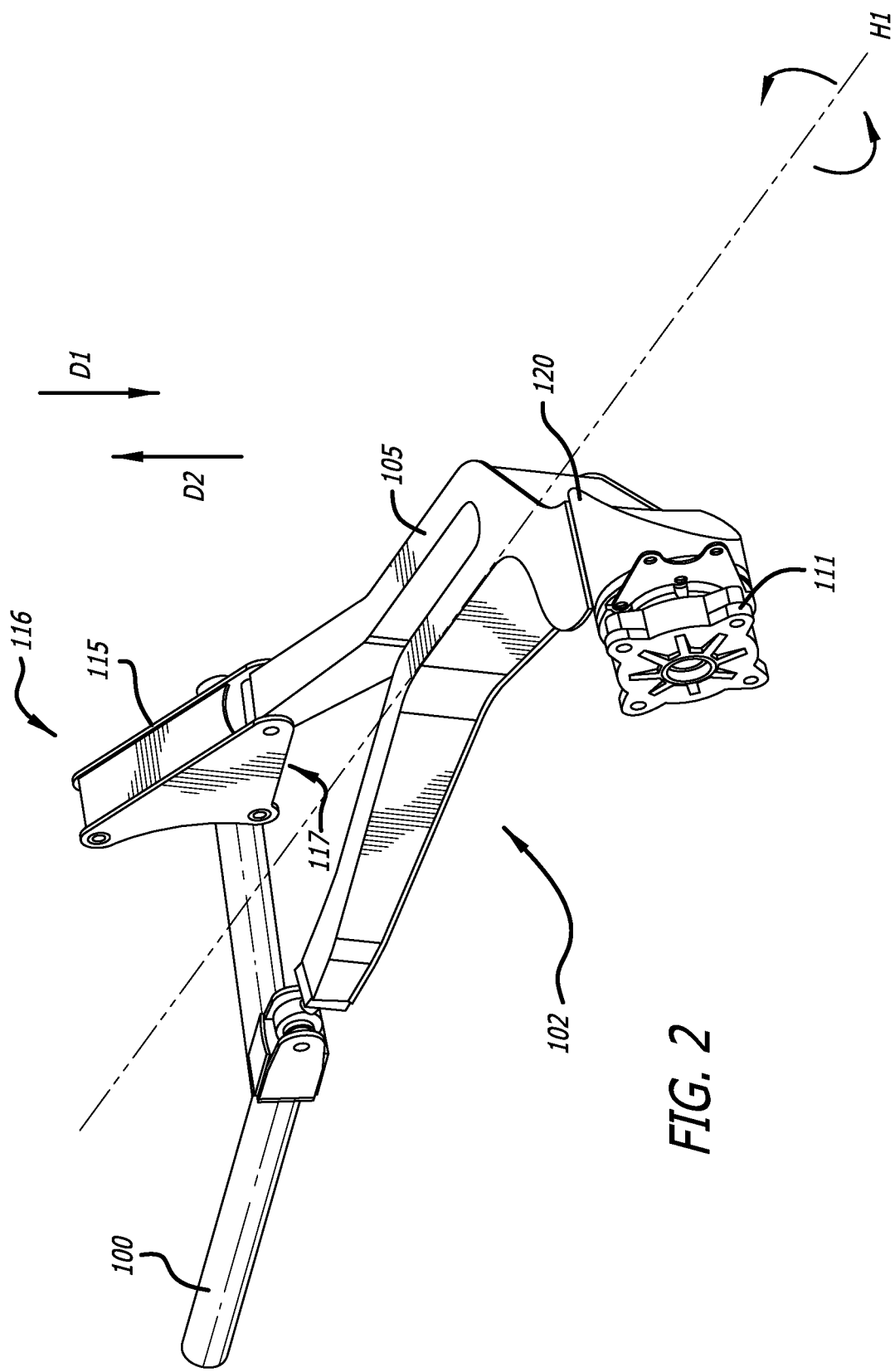
FIG. 2 illustrates a perspective view of an exemplary mounting position of a plunging CV joint according to the present disclosure.

FIG. 2 illustrates a perspective view of an exemplary mounting position of a camber adjusting assembly according to the present disclosure. As shown, the camber adjusting assembly 115 may be used to adjust camber settings in any of various off-road vehicles, including without limitation, UTVs, ATVs, dune buggies, and the like. In some embodiments, an upper and lower ball joint may be implemented. Consequently, if the upper ball joint is positioned further from the center of the off-road vehicle, as compared to the lower ball joint, then the suspension is effective in a positive camber condition. Using the camber adjusting assembly 115, however, the camber may be adjusted to neutralize any positive or negative offset. For example, a force D1 may be applied to a top 116 of the camber adjust member 115 so as to introduce negative camber into the suspension geometry. Similarly, a force D2 may be applied to a bottom 117 of the camber adjusting assembly 115 so as to introduce a positive camber into the suspension geometry. In any event, the camber adjusting assembly is configured to allow for a high degree of variable adjustment, depending on the application.

As shown in FIG. 2, the camber adjusting assembly 115 may be manipulated using either a downward force D1, or an upward force D2, depending on the desired camber condition. When a force is applied to the camber adjusting assembly 115, the trailing arm 105 (and any corresponding component that may be attached thereto) is manipulated such that the wheel/tire combination is "cambered" positively or negatively with respect to a substantially vertical plane. The camber adjusting assembly 115 may be coupled to the trailing arm 105 via a plurality of bearings or any other similar fasteners such as bolts, ball joints and the like. Other types of joints may also be used, including without limitation, single eye, double eye, fork, and knuckle pin configurations. It is envisioned that a plurality of tension inducing mechanisms may be coupled with the camber adjusting assembly 115 so as to "lock in" a particular camber setting. It is envisioned that the camber adjusting assembly 115 may pivot in relation to the chassis elements 100, as well as with respect to the trailing arm 105.

Using the camber adjusting assembly 115, various camber settings may be implemented so as to control a plurality of aspects with respect to off-road vehicle steering and tire wear. For autocross or competitive course applications, greater negative camber values may be utilized. In one embodiment, the camber adjusting assembly 115 may provide substantially 4.5" of adjustment capability, thereby providing significant tolerances with regard to wheel/tire dimensions, such as widths, heights, sidewall thicknesses, and the like. It is to be understood, however, that the camber adjustment may also be measured in degrees from any substantially vertical designation (i.e., zero degrees).

It is contemplated that when the off-road vehicle is steered in either direction, such as during autocross events, or courses with difficult terrain, physical forces on the off-road vehicle will likely cause body roll. This body roll may disadvantageously effect the suspension of the off-road vehicle, and to some extent may also cause the wheels to enter a positive camber condition. In such circumstances, less total surface are of the tire (also known as a contact patch) comes into contact with the terrain, thereby lowering traction and handling capabilities. On the other hand, it may be desirable to enter a negative camber condition so as to preload the off-road vehicle's wheel/tire configuration to a state such that when the off-road vehicle is cornered aggressively, physical forces on the wheel will place it in a substantially vertical orientation with terrain. It should be appreciated that when operating the off-road vehicle in a substantially straight line, a negative camber condition will not provide 100% of the tire's surface area for contact, but it may desirably increase the off-road vehicle's grip in corners or when turning sharply. Consequently, for competitive motorsports, overall track times may improve using the assembly as discussed herein.

Figure 3:
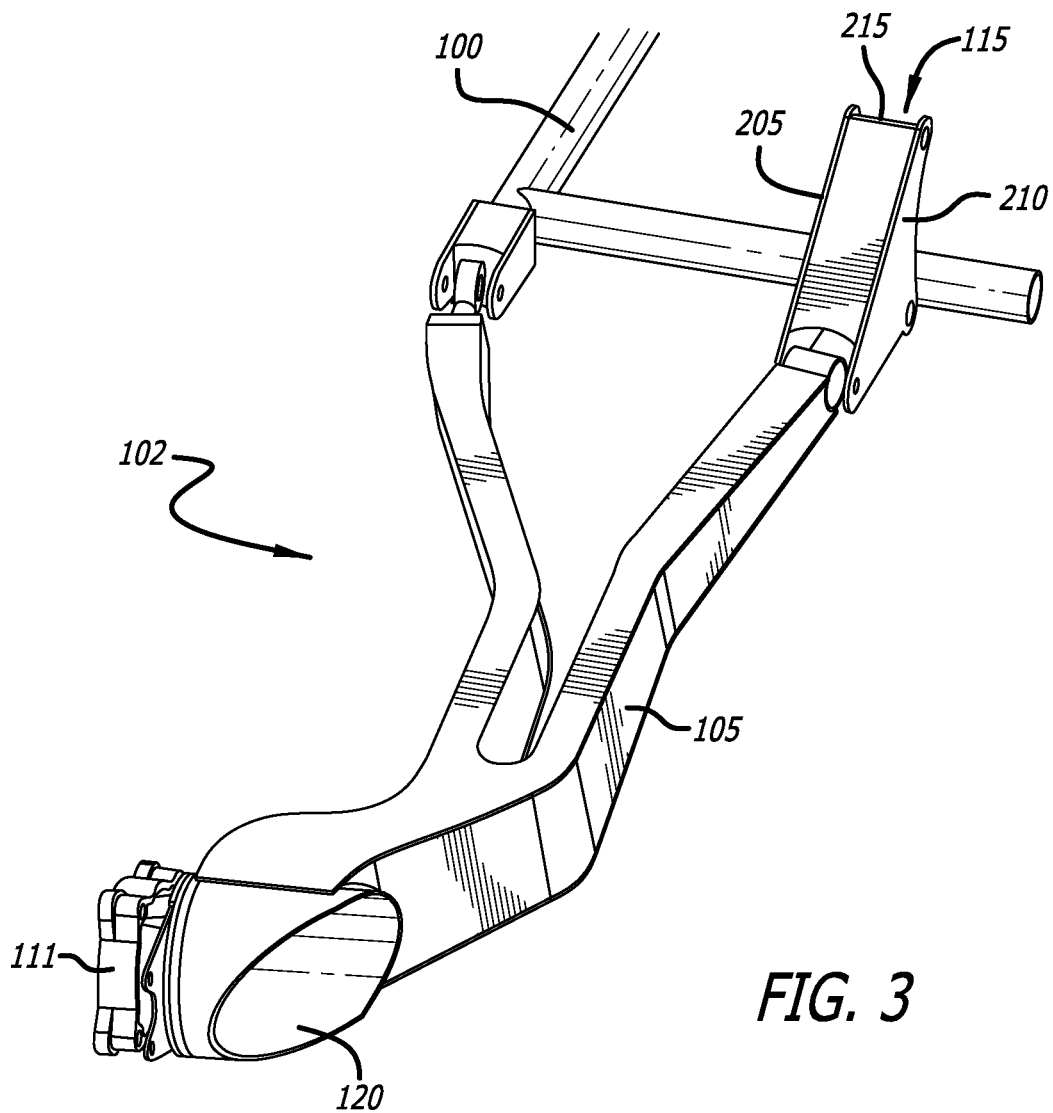
FIG. 3 illustrates a perspective view of an exemplary cylindrical axle support wherein the plunging CV joint may be disposed, according to the present disclosure.

FIG. 3 illustrates a perspective view of an exemplary cylindrical axle support wherein the plunging CV joint may be disposed, according to the present disclosure. In one embodiment, a plunging CV joint may be disposed within the cylindrical axle support member 120. The cylindrical axle support member 120 may be configured to prevent rocks and various other debris from coming into contact with moving parts, and especially the plunging CV joint.

In one embodiment, the camber adjustment assembly 115 comprises first and second plates, 205, 210, that are coupled to a substantially planar center portion 215. The first and second plates 205, 210 comprise a substantially triangular shape with rounded edges. Preferably, a hole is disposed at each of the corners of the first and second end plates, 205, 210 so as to connectively engage with the center portion 215 using any of various suitable fasteners, such as nuts and bolts, and the like. It is envisioned that the camber adjusting assembly 115 may comprise of any of various metals, plastics, and/or rubbers, including by way of non-limiting example, steel, iron, titanium, carbon-fiber, and the like. Furthermore, bearings may be used for greater flexibility and torsional rigidity in a variety of applications.

Figure 4:
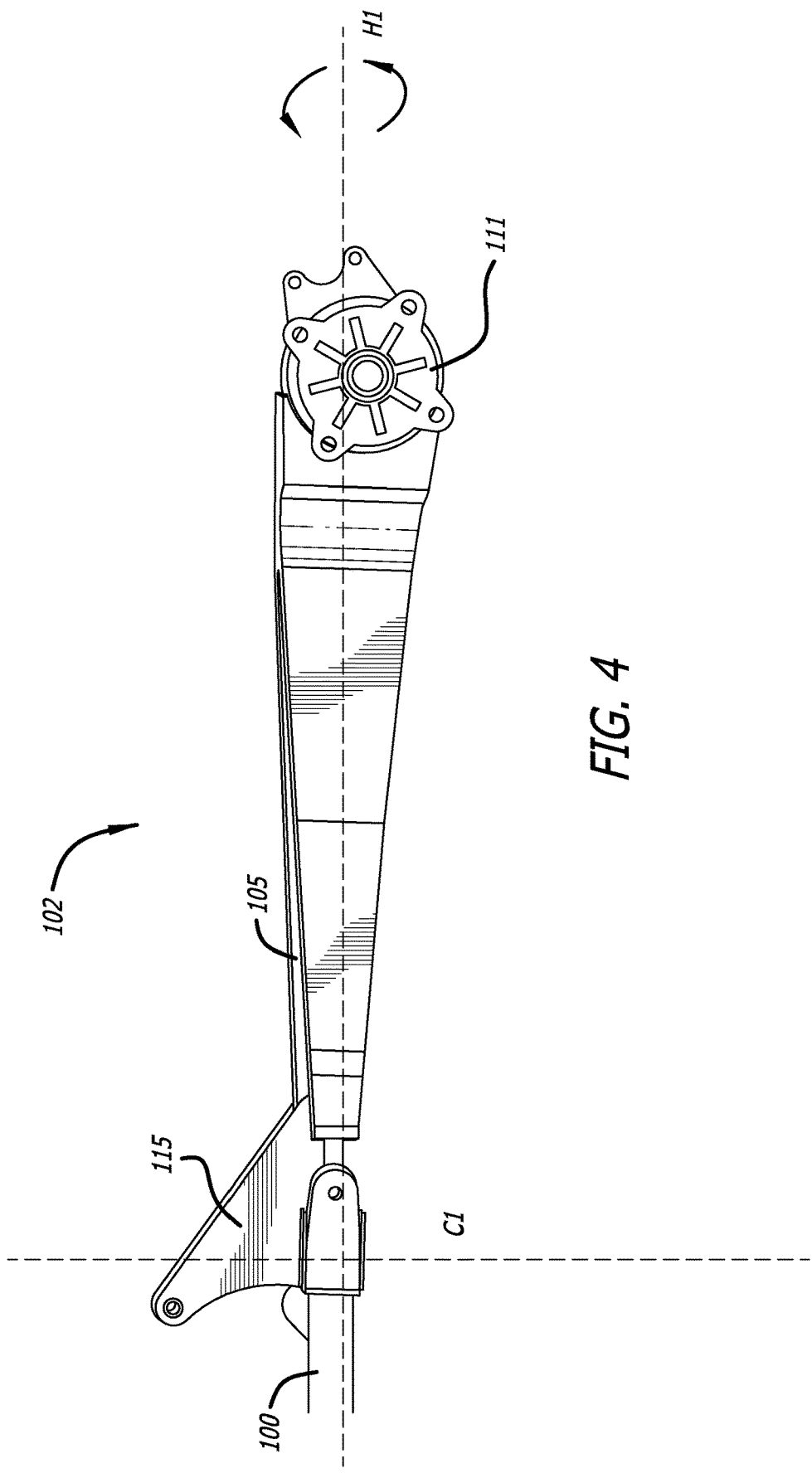
FIG. 4 illustrates a side plan view of an exemplary camber adjusting assembly according to one embodiment of the present disclosure.

FIG. 4 illustrates a side plan view of an exemplary trailing arm and hub configuration according to one embodiment of the present disclosure. As shown, a horizontal plane H1 may be defined along a horizontal cross section of the assembly 102. A vertical plane C1 is shown as being substantially perpendicular with respect to the horizontal plane H1, such that when the camber adjusting assembly 115 is manipulated, a positive or negative camber condition may be realized at the trailing arm 105. In other words, when a force D1 is applied on the camber adjusting assembly 115, as shown in FIG. 2, a rotation is caused about the H1 plane such that a negative camber condition is realized. Similarly, if a force D2 is applied on the camber adjusting assembly 115, a rotation is caused about the H1 plane such that a positive camber condition is realized the trailing arm 105.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An apparatus for adjusting a wheel camber of a vehicle, the apparatus comprising:
   a first end plate and a second end plate having substantially similar triangular shapes;
   the first end plate has a hole disposed at each of a first corner, a second corner, and a third corner of the first end plate;
   the second end plate has a hole disposed at each of a first corner, a second corner, and a third corner of the second end plate; and
   a planar portion disposed between the first end plate and the second end plate.

2. The apparatus of claim 1, wherein the apparatus at the first corner is configured to be hingedly coupled to a trailing arm of the vehicle.

3. The apparatus of claim 1, wherein the apparatus at the second corner and/or the third corner is configured to be adjustably coupled to a chassis of the vehicle.

4. The apparatus of claim 1, wherein the apparatus at the second corner and/or the third corner is configured to be hingedly coupled to a chassis of the vehicle.

5. The apparatus of claim 1, wherein one or more of the second corner and the third corner are configured to enable adjusting the wheel camber between a negative camber angle and a positive camber angle.

6. The apparatus of claim 5, wherein one or more of the second corner and the third corner are configured to introduce a negative wheel camber in response to receiving a downward force.

7. The apparatus of claim 6, wherein one or more of the second corner and the third corner are configured to introduce a positive wheel camber in response to receiving an upward force.

8. The apparatus of claim 7, wherein the apparatus further comprises one or more tension-inducing mechanisms configured to enable biasing the wheel camber to a desired value.

9. An apparatus for adjusting a wheel camber of a vehicle, the apparatus comprises:
   a triangular member coupled to a chassis of the vehicle;
   a trailing arm coupled with the triangular member; and
   a hub for coupling a wheel to the trailing arm.

10. The apparatus of claim 9, wherein the apparatus further comprises one or more tension-inducing mechanisms for biasing the apparatus to a desired camber value.

11. The apparatus of claim 9, wherein the triangular member is configured to adjust the wheel camber according to road conditions.

12. The apparatus of claim 9, wherein the triangular member comprises an upper ball joint and a lower ball joint that are configured to cause a positive camber condition.

13. The apparatus of claim 12, wherein the upper ball joint is positioned further from a center of the vehicle than the lower ball joint.

14. The apparatus of claim 9, wherein the triangular member is configured to be adjustable so as to neutralize any positive or negative camber offset.

15. The apparatus of claim 14, wherein the triangular member is configured to introduce a negative wheel camber in response to receiving a downward force.

16. The apparatus of claim 15, wherein the triangular member is configured to introduce a positive wheel camber in response to receiving an upward force.

17. The apparatus of claim 9, wherein the triangular member is coupled to the trailing arm by way of bearings or fasteners.

18. The apparatus of claim 9, wherein the triangular member is configured to provide substantially 4.5" of adjustment capability.

19. A vehicle comprising:
  an apparatus for adjusting a wheel camber of the vehicle, the apparatus comprises:
    a first end plate and a second end plate having substantially similar triangular shapes;
    the first end plate has a hole disposed at each of a first corner, a second corner, and a third corner of the first end plate;
    the second end plate has a hole disposed at each of a first corner, a second corner, and a third corner of the second end plate; and
    a planar portion disposed between the first end plate and the second end plate,
  wherein the apparatus at the first corner is hingedly coupled to a trailing arm of the vehicle,
  wherein the apparatus at the second corner and/or the third corner is adjustably coupled to a chassis of the vehicle.

* * * * *